United States Patent
Lee et al.

(10) Patent No.: US 9,984,232 B2
(45) Date of Patent: May 29, 2018

(54) METHOD OF OPERATING SECURITY FUNCTION AND ELECTRONIC DEVICE SUPPORTING THE SAME

(71) Applicant: Samsung Electronics Co., Ltd., Gyeonggi-do (KR)

(72) Inventors: Jungkyuen Lee, Gyeonggi-do (KR); Kyungsoo Kwag, Gyeonggi-do (KR); Jaemin Ryu, Gangwon-do (KR); Kyungim Jung, Gyeonggi-do (KR); Hyunjin Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/278,708

(22) Filed: May 15, 2014

(65) Prior Publication Data
US 2014/0344889 A1   Nov. 20, 2014

(30) Foreign Application Priority Data
May 15, 2013 (KR) .................... 10-2013-0055130

(51) Int. Cl.
*G06F 21/00* (2013.01)
*G06F 21/54* (2013.01)

(52) U.S. Cl.
CPC ...... *G06F 21/54* (2013.01); *G06F 2221/2105* (2013.01)

(58) Field of Classification Search
CPC .......... G06F 21/54; G06F 2221/2105; G06F 21/575; G06F 21/31; G06F 21/577; G06F 3/04817; G06F 3/0482; G06F 21/10; G06F 21/62; G06F 2221/2113; G06F 21/121; H04W 12/08
See application file for complete search history.

(56) References Cited

U.S. PATENT DOCUMENTS

| | | | | |
|---|---|---|---|---|
| 6,255,937 | B1* | 7/2001 | Hamaguchi | B06B 1/0215 340/384.7 |
| 2006/0030295 | A1* | 2/2006 | Adams | H04M 1/72552 455/410 |
| 2007/0235539 | A1* | 10/2007 | Sevanto | G06K 7/10237 235/451 |
| 2011/0098056 | A1* | 4/2011 | Rhoads | G01C 21/20 455/456.1 |
| 2013/0042295 | A1* | 2/2013 | Kelly | G06F 21/53 726/1 |

(Continued)

FOREIGN PATENT DOCUMENTS

JP    1995-234836 A    5/1995

OTHER PUBLICATIONS

Dell NPL—2001 obtained from https://www.dell.com/support/article/us/en/19/sln151727/boot-into-safe-mode-in-windows-xp-on-your-dell-pc?lang=en.*

*Primary Examiner* — Tri Tran
(74) *Attorney, Agent, or Firm* — The Farrell Law Firm, P.C.

(57) ABSTRACT

A method and an electronic device are provided for operating a security function. The method includes receiving a request for activation of a security function, confirming whether a security indicator is set, and when the security indicator is set, applying the security indicator to a security function screen image, based on activation of the security function, and outputting the security function screen image to a display of the electronic device.

18 Claims, 7 Drawing Sheets

(56) References Cited

U.S. PATENT DOCUMENTS

2013/0111605 A1* 5/2013 Maeda .................... G06F 21/60
                                                                  726/27
2014/0283142 A1* 9/2014 Shepherd .............. G06F 3/0482
                                                                  726/30

* cited by examiner

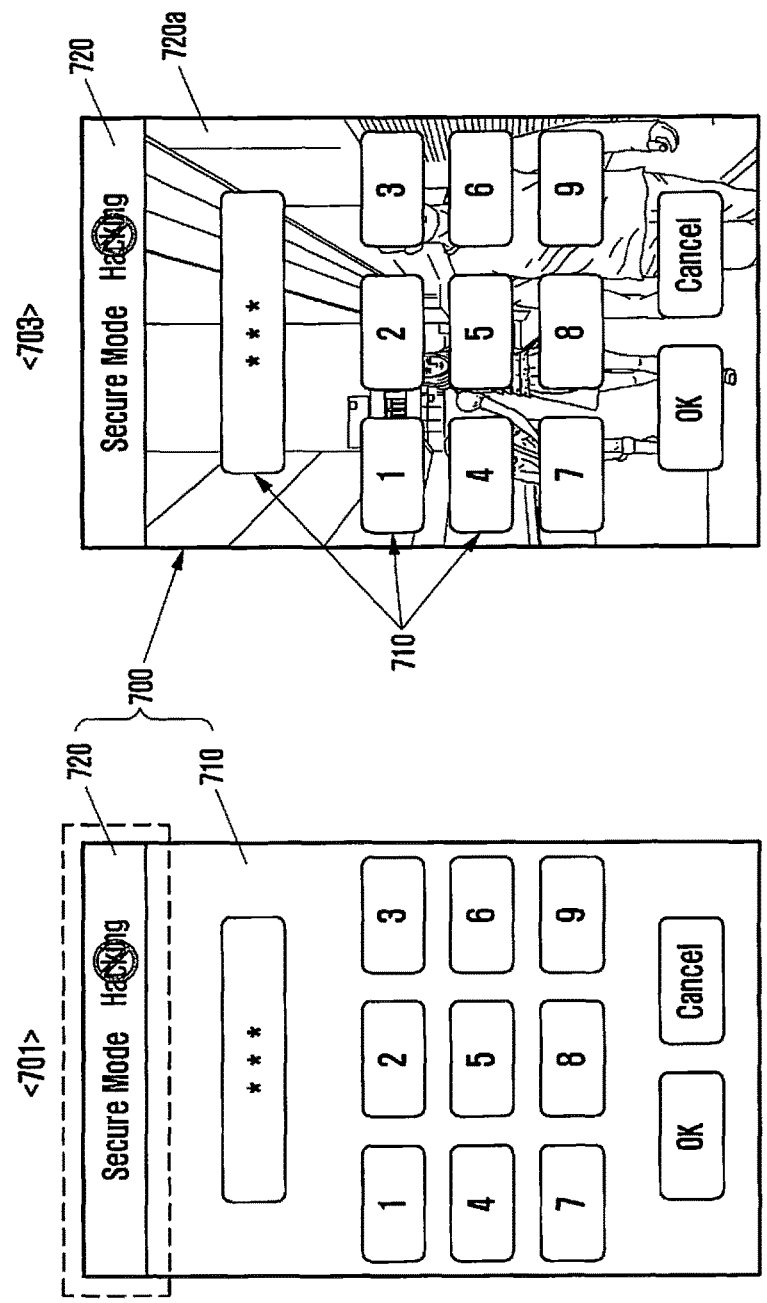

METHOD OF OPERATING SECURITY FUNCTION AND ELECTRONIC DEVICE SUPPORTING THE SAME

PRIORITY

This application claims priority under 35 U.S.C. § 119(a) to Korean Patent Application No. 10-2013-0055130, filed in the Korean Intellectual Property Office on May 15, 2013, the entire content of which is incorporated herein by reference.

BACKGROUND OF THE INVENTION

1. Field of the Invention

The present invention relates generally to a security function, and more particularly, to an operation of a security indicator of an electronic device.

2. Description of the Prior Art

Due to recent developments in hardware technology, electronic devices support the operation of various user functions. Such user functions, including a web access function, a game function, a news search function, a document editing function, and the like, is installed in an electronic device in the form of applications.

A user function requests a security function during the process of activating an application installed on an electronic device. However, there is a problem in that a user is unable to determine whether the user function is being operated based on the security function or whether the security function is not supported by the application. Accordingly, users are unable to rely on the safety of operating an application, which using a specific user function of the application.

SUMMARY

The present invention has been proposed to solve at least the problems and disadvantages described above and to provide at least the advantages described below.

Accordingly, an aspect of the present invention is to provide a method of operating a security function, which supports a function of providing a security indicator, and an electronic device supporting the same.

In accordance with an aspect of the present invention, a method of operating a security function of an electronic device is provided. The method includes receiving a request for activation of a security function, confirming whether a security indicator is set, and when the security indicator is set, applying the security indicator to a security function screen image, based on activation of the security function, and outputting the security function screen image to a display of the electronic device.

In accordance with another aspect of the present invention, an electronic device supporting a security function operation of an electronic device is provided. The electronic device includes a control module configured to receive a request for activation of a security function, to confirm whether a security indicator is set, and when the security indicator is set, to apply the security indicator to a security function screen image, based on the activation of the security function, and a display module configured to output the security function screen image to a display of the electronic device.

As described above, according to the method for operating the security function, and the electronic device supporting the same, it is possible to support a user in operating an application of a security function, or in recognizing a situation to which a security function is actually applied.

BRIEF DESCRIPTION OF THE DRAWINGS

The above and other aspects, features and advantages of the present invention will be more apparent from the following detailed description taken in conjunction with the accompanying drawings, in which:

FIG. 7 is an illustration of a screen of an electronic device used for applying a security indicator according to an embodiment of the present invention.

DETAILED DESCRIPTION OF EMBODIMENTS OF THE PRESENT INVENTION

Hereinafter, various embodiments of the present invention will be described in detail with reference to the accompanying drawings.

In describing the embodiments of the present invention, descriptions related to technical contents which are well-known in the art to which the present invention pertains, and are not directly associated with the present invention, will be omitted. Moreover, detailed descriptions related to configuration elements having substantially identical configurations and functions as other configuration elements will be omitted.

For the same reason, in the accompanying drawings, some configuration elements is exaggerated, omitted, or schematically shown, and a size of each element may not precisely reflect the actual size. Accordingly, the present invention is not restricted by a relative size or interval shown in the accompanying drawings.

Figure 1:
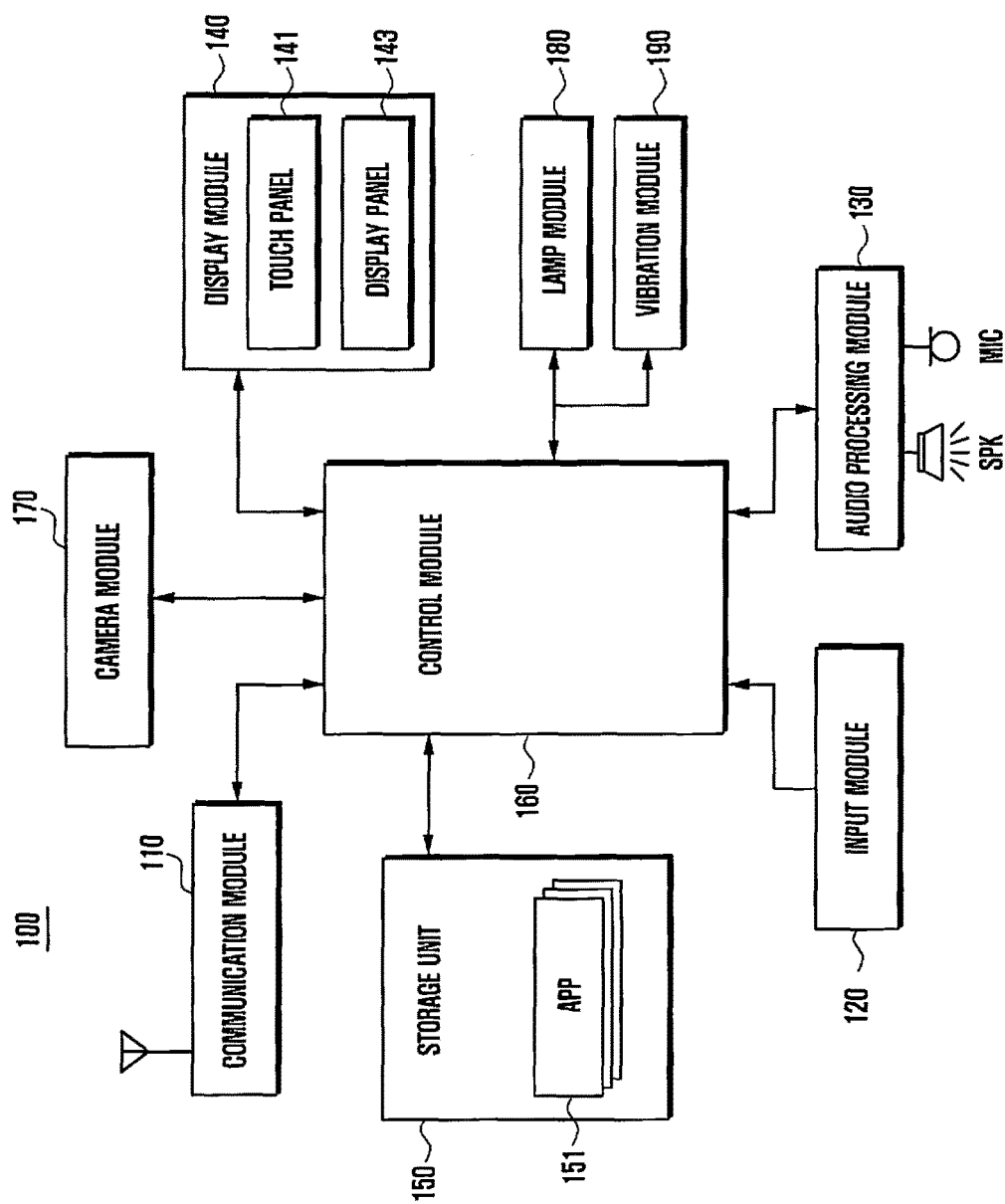
FIG. 1 is a block diagram illustrating a an electronic device supporting a security function operation according to an embodiment of the present invention.

FIG. 1 is a block diagram illustrating an electronic device supporting a security indicator operation according to an embodiment of the present invention.

Referring to FIG. 1, an electronic device 100 includes a communication module 110, an input module 120, an audio processing module 130, a display module 140, a storage unit 150, and a control module 160. In addition, the electronic device 100 further includes a camera module 170, a lamp module 180, and a vibration module 190. The control module 160 is an element corresponding to a chipset and the like corresponding to a hardware element. Further, the control module 160 includes at least one processor uploaded on hardware. At least one processor included in the control module 160 supports signal processing, data processing, and the like for outputting a security indicator according to various embodiments of the present invention.

The electronic device 100 performs reading or storing data according to an operation of an application (hereinafter, referred to as an "app") during a process in which the app stored in the storage unit 150 is activated. In this case, the electronic device 100 outputs a security indicator on the display module 140 when a security function is required during the operation of the app. The electronic device 100 applies and displays the security indicator on at least a part of a security function operation screen image. A user may confirm the security function operation through the display of the security indicator, thereby having reliability in the operation of a corresponding function.

In accordance with an embodiment of the present invention, the control module 160 is implemented with a trusted ARM environment. The control module 160 of the trusted ARM environment includes a hardware portion for supporting operation of the electronic device 100 in a non-trusted operation environment and a hardware portion for supporting operation of the electronic device 100 in a trusted operation environment. A security operation system supporting a processor and a security storage region in which data for supporting the trusted operation environment is stored is included in the hardware portion for supporting the trusted operation environment.

The communication module 110 supports a communication function of the electronic device 100. The communication module 110 forms various communication channels for supporting a message service function, a web page searching function, a video call function, a voice call function, a data transmission and receiving function, and a cloud function of the electronic device 100. The electronic device 100 also provides various apps for supporting the function of the communication module 110. The user operates an app function through activation of the corresponding app.

The communication module 110 establishes a communication channel with a specific service device. In this case, the communication module 110 is operated according to a trusted operation mode during at least a part of the process of communicating with the corresponding service device. During operation in the trusted operation mode, the control panel controls the display module 140 to display a screen image including the security indicator. The communication module 110 may receive various apps. Accordingly, a security relevant routine, among routines included in the received apps, is stored while in the trusted operation mode.

The communication module 110 includes various modules based on the communication capabilities of the electronic device 100. For example, the communication module 110 is a communication module capable of using a mobile communication network. The communication module 110 is a communication module capable of using an Internet network, for example, a Wi-Fi network and a wired network. The communication module 110 is a communication module capable of using near field communication, such as Bluetooth communication. The operation of the communication module 110 is controlled by the control module 160. The operation of the routine designed to request security during the operation of the communication module 110 is controlled based on the electronic device 100 being in the trusted operation mode. On the other hand, when the electronic device 100 is in the non-trusted operation mode, the routine designed to request security during the operation of the communication module 110 is not operated.

The input module 120 generates various input signals for the operation of the electronic device 100. The input module 120 includes button key or a specific key, such as a side key and a home key. The key of the input module 120 is a key for operating a corresponding app in a state where one app is activated. The input module 120 generates an input signal for activating at least one app supported by the electronic device 100 and an input signal for calling the security function during the operation of the app based on a request by the user. The input module 120 generates an input signal requesting turn-on and turn-off of the electronic device 100, an input signal requesting booting of the electronic device 100, an input signal requesting setting of the security indicator, an input signal requesting a change in the set security indicator, and the like. In addition, the input module 120 generate a text input signal to be used as the security indicator or an image selection or input signal to be used as the security indicator when setting or changing the security indicator according to a request of the user. The input signal generated by the input module 120 is transmitted to any one of the normal world or the secure world.

The audio processing module 130 processes various audio signals generated during the process of operating the electronic device. For example, the audio processing module 130 includes a speaker SPK for supporting output of an audio signal generated or decoded by the electronic device 100. Further, the audio processing module 130 includes a microphone MIC capable of collecting an audio signal for supporting a voice call or video call function, a recording function, and the like.

The audio processing module 130 performs output of a guide sound guiding the security operation in accordance with an embodiment of the present invention. To this end, the electronic device 100 pre-stores a guide sound or receives an external guide sound and stores the guide sound. The audio processing module 130 supports so that the guide sound is output when a corresponding function is applied. Audio data output by the audio processing module 130 includes a guide sound guiding application of a security function of a specific app, a guide sound or an effect sound guiding output of a security indicator, and a guide sound or an effect sound guiding completion of the security function when the activation of an app is requested. The audio processing module 130 performs output of a guide sound or an effect sound corresponding to a security indicator. For example, the guide sound or the effect sound of the security indicator is output together with the security indicator in a form of an image or a text or is independently output.

The display module 140 outputs various function screen images necessary for the process of operating the electronic device 100. For example, the display module 140 outputs a menu image, a specific app operation screen image, a plurality of app operation screen images, and the like. The display module 140 outputs an app operation screen image having the security function. The app operation screen image having the security function includes a non-trusted operation image and a secure environment operation image. Otherwise, a entire app operation screen image having the security function is formed of a security operation image.

The display module 140 outputs a booting image, an image for setting a security indicator in a booting process, an image for setting or changing a security indicator after completion of the booting, and the like. The display module 140 outputs a security function screen image to which the security indicator is applied when the security function is activated. The image to which the security indicator is applied will be described in more detail through a screen interface, and the like to be described below.

The display module 140 includes a display panel 143 and a touch panel 141. The display panel 143 outputs the aforementioned various screen images. The touch panels 141 generates a touch event according to manipulation of the user. The touch panel 141 is at least one of a resistive touch panel, a capacitive touch panel, and an electromagnetic induction touch panel. The touch panel 141 generates at least one of a touch event requesting the setting and the change of the security indicator and a touch event for inputting a character or an image to be used as the security indicator. In this case, the touch event generated by the touch panel 141 includes a single touch event, a multi-touch event, such as a double tap or a pinch, a drag event, and the like. Further, the touch panel 141 generates a touch event of touching a specific virtual key button according to control of the user during the operation of a non-trusted function or the security function. The touch event generated in the touch panel 141 is provided in the non-trusted operation mode or the trusted operation mode of the control module 160 according to the type of the currently operated function.

The storage unit 150 stores various application programs necessary for the operation of the electronic device 100 and stores various data generated in the operation of the electronic device 100. For example, the storage unit 150 stores programs including an operating system required for the operation of the electronic device 100. The storage unit 150 stores various apps related to a user function. The storage unit 150 is a storage region prepared in a non-trusted environment. Otherwise, the storage unit includes a region accessible in the non-trusted operation environment and a region accessible by the trusted operation environment. The storage unit 150 stores a plurality of apps 151.

The plurality of apps 151 include application programs supporting various functions installed in the electronic device 100. The plurality of apps 151 are provided in a form of icons or separate menu items to the display unit 140, or are activated according to a user's request or according to schedule information while being allocated to hot keys. For example, the plurality of apps 151 includes various apps, such as a voice call app, a video call app, a cloud app, a camera app, a web access app, a social network connection app, and a finance app.

For example, the plurality of apps 151 includes at least one app including a routine for supporting the security function. The plurality of apps 151 may include finance applications include the security function. These finance applications may include applications capable of accessing online banking service devices providing different services, for example, different types of online banking service devices. Routines included in a finance application may include a routine for paying for a product, a routine for accessing a bank, a routine for checking a bank account, a routine for account transfer, and the like. The finance application may also include a security routine for inputting a password, an account number, or a financial account. Information requested for the security routine is applied in the trusted operation environment. Otherwise, the security routine is stored in the trusted operation environment. The plurality of apps 151 may include an app which sets the security indicator during a runtime process after the completion of the booting. The plurality of apps 151 may include a security app requesting a security indicator.

When the storage unit 150 is divided into the region which the non-trusted operation environment can access, and the region which the trusted operation environment can access, as described above, the security routine is stored in the region, which the trusted operation environment can access, of the storage unit 150. Further, the security indicator according to the embodiment of the present invention is also stored in the storage unit 150.

The security routine or the security data applied to the security routine is encrypted and stored in the storage unit 150. Key information used in encryption is stored in a separate security storage region prepared in the trusted operation environment. When security information is encrypted and stored, the security indicator is encrypted and stored in the storage unit 150.

The control module 160 supports processing of various signals and data related to the operation of the electronic device 100 in an embodiment of the present invention. That is, when the control module 160 is requested to activate a specific app, the control module 160 supports so as to perform the operation of the specific app and output an app operation screen image to the display unit 140. In this process, the control module 160 performs controlling a signal for supporting at least one of the setting and the outputting of the security indicator. A detailed configuration and function of the control module 160 will be described in more detail with reference to FIG. 2.

Figure 2:
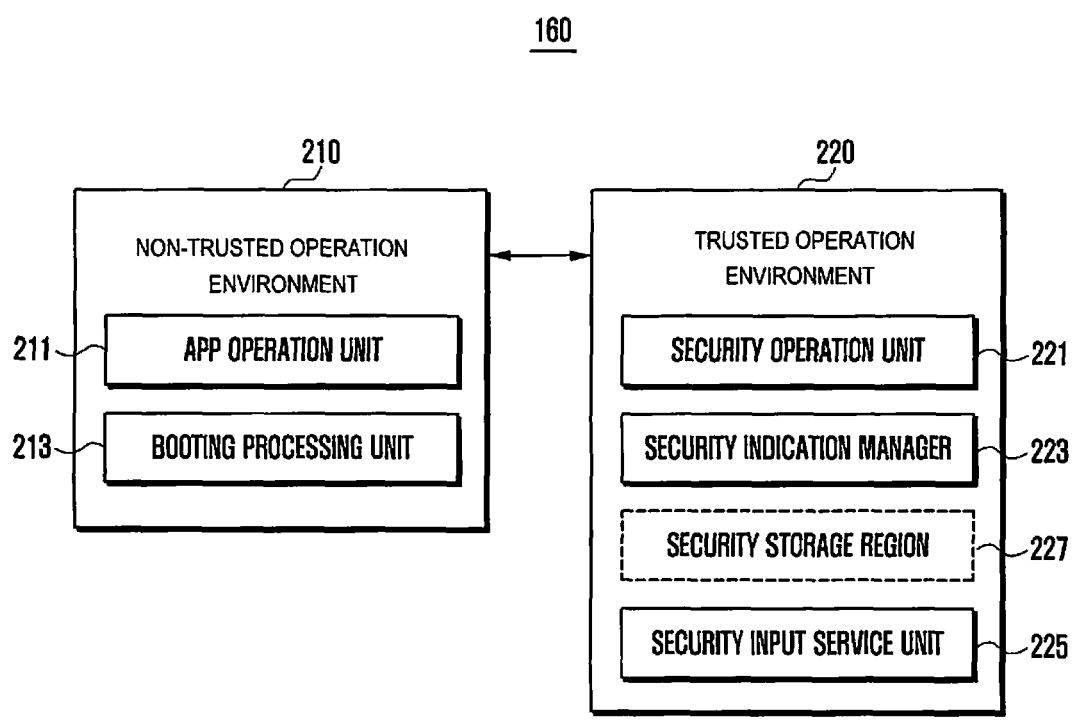
FIG. 2 is a block diagram illustrating a control module an electronic device according to an embodiment of the present invention.

FIG. 2 is a block diagram illustrating a control module of an electronic device according to an embodiment of the present invention.

Referring to FIG. 2, the control module 160 of the present invention includes a non-trusted operation environment 210 and a trusted operation environment 220.

The non-trusted operation environment 210 includes an app operation unit 211 and a booting processing unit 213. The non-trusted operation environment 210 controls the operation of the plurality of apps 151 to which the security function is not applied. Additionally, the non-trusted operation environment 210 controls the operation of the plurality of apps 151 designed so that a partial routine performs the security function. In this case, when the non-trusted operation environment 210 is requested to execute a routine for the security function, the non-trusted operation environment 210 requests the execution of the routine from the trusted operation environment 220. Then, when the corresponding security function routine is completely executed in the trusted operation environment 220, the non-trusted operation environment 210 controls so as to continue performing the non-trusted function again.

The app operation unit 211 controls the operation of the plurality of apps 151 of the electronic device 100. The app operation unit 211 provides an icon or a menu item for activating at least one of the plurality of apps 151 stored in the storage unit 150. The app operation unit 211 controls so as to activate and operate an idle screen supporting app and the like of the electronic device 100 as a default. The plurality of apps 151 activated by the app operation unit 211 may be apps having the non-trusted function. Further, the plurality of apps 151 activated by the app operation unit 211 may be apps having the security function. When the security function is requested during the performance of a specific app of the plurality of apps 151, the app operation unit 211 requests performance of the corresponding security function from the trusted operation environment 220. The app operation unit 211 controls the activation of the at least one of the plurality of apps 151 for setting the security indicator according to a request of the user. The app operation unit 211 controls the operation of the non-trusted function after the completion of the security function.

The booting processing unit 213 processes a booting process of the electronic device 100. When an input signal for requesting the booting or an input signal requesting turn-on in a state where power is turned off is generated, the booting processing unit 213 performs the booting. The booting processing unit 213 requests the booting of the trusted operation environment 220 from the trusted operation environment 220 in the booting process. For example, the booting processing unit 213 requests the booting of the trusted operation environment 220 from the security operation unit 221. When the booting of the trusted operation environment 220 is completed, the booting processing unit 213 receives acknowledgment of the completion of the booting of the trusted operation environment from the trusted operation environment 220. Then, the booting processing unit 213 processes the booting of the non-trusted operation environment 210. When the booting processing unit 213 completes the booting, the booting processing unit 213 controls so as to output a specific function screen image according to a set schedule. For example, the booting processing unit 213 controls so as to output the idle screen, an icon, or a widget image to the display unit 140.

The non-trusted operation environment 220 includes a security operation unit 221, a security indication manager 223, and a security input service unit 225. The trusted operation environment 220 includes a security storage region 227. The security region 220 processes a routine related to the security function during the operation of the app 151 of the electronic device 100. Particularly, the trusted operation environment 220 controls processing of the security function according to a request of the non-trusted operation environment 210. The input signal generated by the input module 120 and the touch event generated in the display module 140, excluding the input signal for ending the security function, is provided only to the trusted operation environment 220 while the trusted operation environment 220 supports the security function. When the security function is completed or ended, the trusted operation environment 220 provides the non-trusted operation environment 210 with authorization for processing the input signal or the touch event.

The security operation unit 221 supports the processing of the booting of the trusted operation environment 220. When the security operation unit 221 receives the request for booting of the trusted operation environment from the booting processing unit 213, the security operation unit 221 processes booting of the trusted operation environment. In this process, the security operation unit 221 confirms whether the security indicator is set. Further, when the security indicator is set, the security operation unit 221 omits the setting of the security indicator. Alternatively, the security operation unit 221 may request the setting of the security indicator from the security indication manager 223 even though the security indicator is set. The request for setting of the security indicator may be changed according to a change in user setting or an intension of a designer.

The security operation unit 221 is in an idle state when the booting of the trusted operation environment is complete. The security operation unit 221 performs the processing of the security function according to the request of the non-trusted operation environment 210 in the idle state. For example, the security operation unit 221 calls the security input service unit 225 for processing a security input function.

The security indication manager 223 controls the setting and the changing of the security indicator. The security indication manager 223 is requested to set the security indicator from the security operation unit 221, or is requested to change the security indicator from the app operation unit 211 of the non-trusted operation environment 210. When the security indication manager 223 is requested to set or change the security indicator, the security indication manager 223 controls to output a security indicator setting screen image or a security indicator change screen image in response to the request to the display module 140.

Further, the security indication manager 223 controls the set security indicator to be stored in the security storage region 227. Alternatively, the security indication manager 223 may store the security indicator in a storage region prepared so that the trusted operation environment 220 can access it. Otherwise, the security indication manager 223 encrypt the security indicator and store the encrypted security indicator in a predetermined region of the storage unit 150. The stored security indicator includes at least one of a text and an image. To this end, the security indication manager 223 controls so that at least one image stored in the storage unit 150 is selected. The security indication manager 223 supports photographing of an image to be used as the security indicator. To this end, the security indication manager 223 controls activation of the camera module 170. In this case, the control of the camera module 170 is operated in the trusted operation environment 220, and access from the non-trusted operation environment 210 is blocked. When the camera module 170 collects an image, the corresponding image is provided to the security indication manager 223 of the trusted operation environment 220. The security indication manager 223 supports a function of editing the collected image. The user may edit the collected image for operating the security indicator in an appropriate form. The selected or collected image is output on at least a part of a screen region of the display module 140 as the security indicator. The security indication manager 223 supports inputting of an image to be used as the security indicator. To this end, the security indication manager 223 blocks access from the non-trusted operation environment 210 of the input module 120 and the display module 140 during a period of setting the security indicator. The input signals generated in the input module 120 and the display module 140 are provided to the security indication manager 223.

When the security indication manager 223 is requested to process the security function from the security operation unit 221 or the security input service unit 225, the security indication manager 223 calls the stored security indicator. Further, the security indication manager 223 provides the security indicator for configuring the screen image. For example, the security indication manager 223 provides the security indicator to the security input service unit 225. In this case, the security indication manager 223 provides the security indicator stored in the security storage region 227 to the security input service unit 225. Otherwise, when the security indicator is encrypted and stored in the storage unit 150, the security indication manager 223 decodes the encryption by using a key stored in the security storage region 227, and provides the security input service unit 225 with the decoded security indicator. The aforementioned security indication manager 223 controls the setting and the output of the security indicator.

The security input service unit 225 processes a function of inputting the security from the non-trusted operation environment 210. To this end, the security input service unit 225 receives input control authority of the input module 120 or the touch panel 141 from the non-trusted operation environment 210. Further, the security input service unit 225 outputs a security input screen image to the display module 140. In this case, the security input service unit 225 receives information corresponding to the security indicator, for example, an output position of a text or an image, or corresponding information, from the security indication manager 223, and applies the received information to the security input screen image. An example of the security input screen image is described in more detail with reference to the accompanying drawings.

The security storage region 227 is a storage region physically disposed in a predetermined region of the trusted operation environment 220. The security storage region 227 is a storage region accessible only from the trusted operation environment 220. The security storage region 227 stores various information necessary for the operation of the trusted operation environment 220. For example, the security storage region 227 stores the specific routines of the security function, a security algorithm, an encryption algorithm, an encryption key, etc. The security storage region 227 stores security indicator information. In this case, the security indicator information stored in the security storage region 227 includes information about data corresponding to at least one of a text and an image, a position in the screen at which the security indicator is output, a form of the output of the security indicator, etc. When the security indicator is encrypted and stored in the storage unit 150, key information capable of decoding the encrypted security indicator is stored in the security storage region 227. The security indicator information stored in the security storage region 227 is called by the security indication manager 223 and used during the operation of the security function. Further, the security indicator information is renewed or deleted according to a request of the user.

The security storage region 227 stores screen image information for supporting the security input service unit 225. The screen image information is an input screen image for inputting, for example, a number. Otherwise, the screen image information is an input screen image for inputting various patterns or images.

Figure 3:
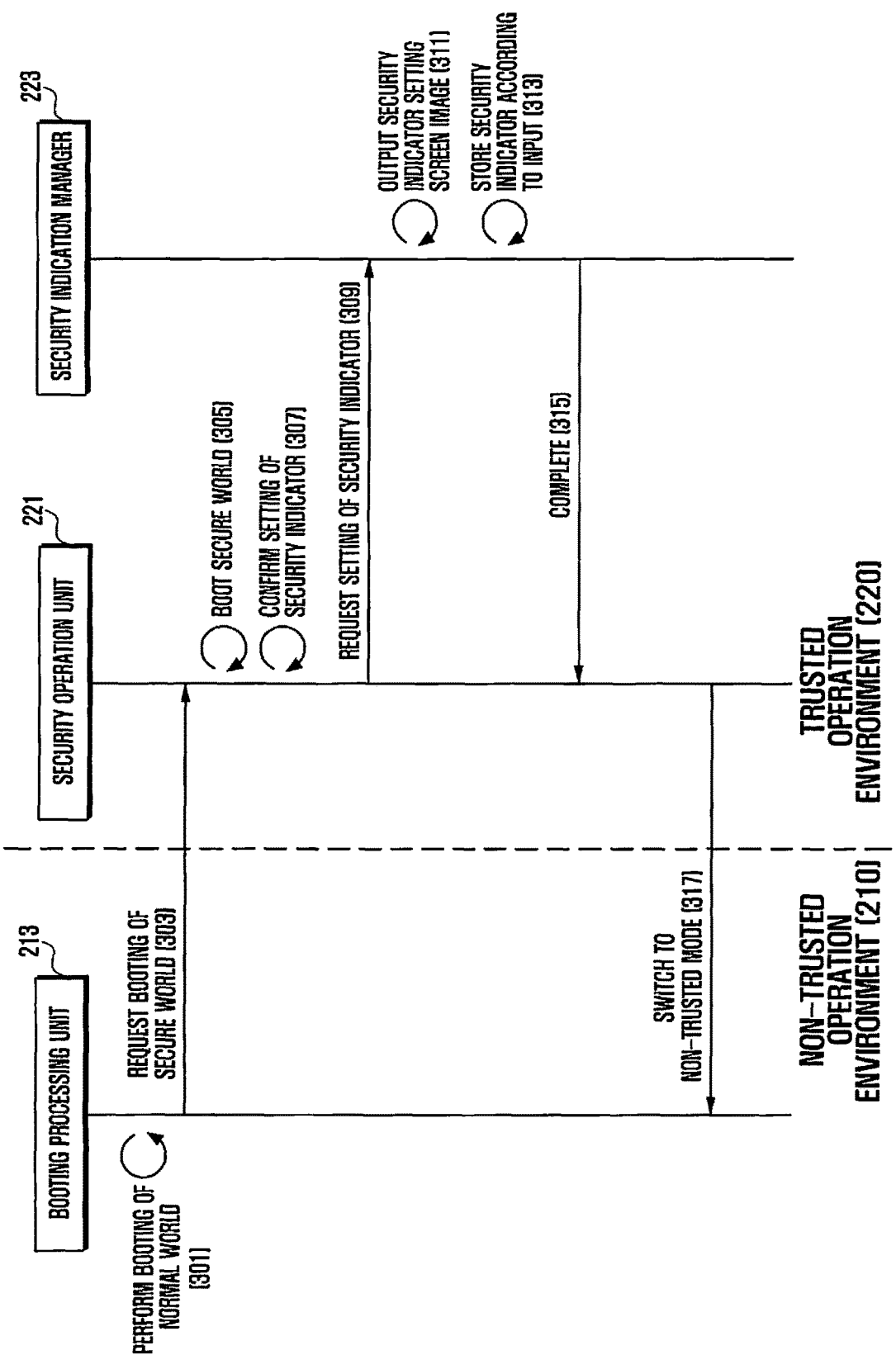
FIG. 3 is a signal flow diagram illustrating a method of setting a security indicator according to an embodiment of the present invention.

FIG. 3 is a signal flow diagram illustrating a method of setting a security indicator according to an embodiment of the present invention.

Referring to FIG. 3, in a method of operating the electronic device for an operation of setting the security indicator according to an embodiment of the present invention, in step 301, the booting processing unit 213 first boots the non-trusted operation environment 210. In step 303, the booting processing unit 213 transmits a booting request to the trusted operation environment 220 during the process of booting the non-trusted operation environment 210 in operation process 303. In this case, the booting processing unit 213 transmits the booting request of the trusted operation environment 220 to the security operation unit 221.

When the security operation unit 221 receives the booting request from the booting processing unit 213, the security operation unit 221 processes the booting of the trusted operation environment 220 in step 305. In this case, the security operation unit 221 loads an operating system for operating the trusted operation environment 220 and initializes the corresponding operating system. The security operation unit 221 confirms setting of the security indicator in step 307. That is, the security operation unit 221 confirms whether the security indicator has been applied. Further, when there is no setting of the security indicator, the security operation unit 221 provides the security indication manager 223 with a security indicator setting request in step 309.

When the security indication manager 223 is requested to set the security indicator from the security operation unit 221, the security indication manager 223 controls so that the security indicator setting screen image is output to the display module 140 in step 311. The trusted operation environment 220 performs security processing on an input signal or a touch event input during the output of the security indicator setting image screen to the display module 140. That is, the trusted operation environment 220 controls so that a signal generated in the input module 120 or the touch panel 141 is directly transmitted to the trusted operation environment 220. An example of a screen interface of the security indicator setting screen image will be described in more detail with reference to the accompanying drawings.

The security indication manager 223 controls so that the security indicator according to the input is stored in step 313. When the security indicator setting screen image is output on the display module 140, the user may set the security indicator through the corresponding security indicator setting screen image. The security indicator setting screen image provides various items so as to select or collect various information to be used as the security indicator. Further, the security indication manager 223 stores at least one of the selected or collected text and image as the security indicator under the control of the user. In this case, the security indication manager 223 encrypts and stores the security indicator in the storage unit 150, or stores the security indicator in a separate storage region prepared so that only the trusted operation environment 220 can access it. The separate storage region is physically disposed outside the control module 160. The security indication manager 223 stores the security indicator in the security storage unit 227. An encryption key used for encrypting the security indicator is stored in the security storage region 227. When the setting of the security indicator is completed through the storage of the security indicator, the security indication manager 223 transmits a completion message to the security operation unit 221 in step 315. Here, when the setting of the security indicator is cancelled, the security indication manager 223 transmits a cancellation message to the security operation unit 221 or transmit a completion message to the security operation unit 221.

The security operation unit 221 may request a non-trusted mode switching from the booting processing unit 213 in step 317. The security operation unit 221 may have a standby state together with the request for the non-trusted mode switching. The standby state is a state waiting for a call from the non-trusted operation environment 210. When acknowledgement of the completion of the booting of the trusted operation environment 220 is received from the security operation unit 221, the booting processing unit 213 completes the booting of the non-trusted operation environment 210 and controls so that a preset function is performed or a preset screen image is output to the display module 140. Alternatively, when the booting processing unit 213 completes the booting, the booting processing unit 213 requests a schedule function to be processed later from another processor of the non-trusted operation environment 210, and another processor processes a specific user function or a standby screen image output function according to the set schedule function.

Figure 4:
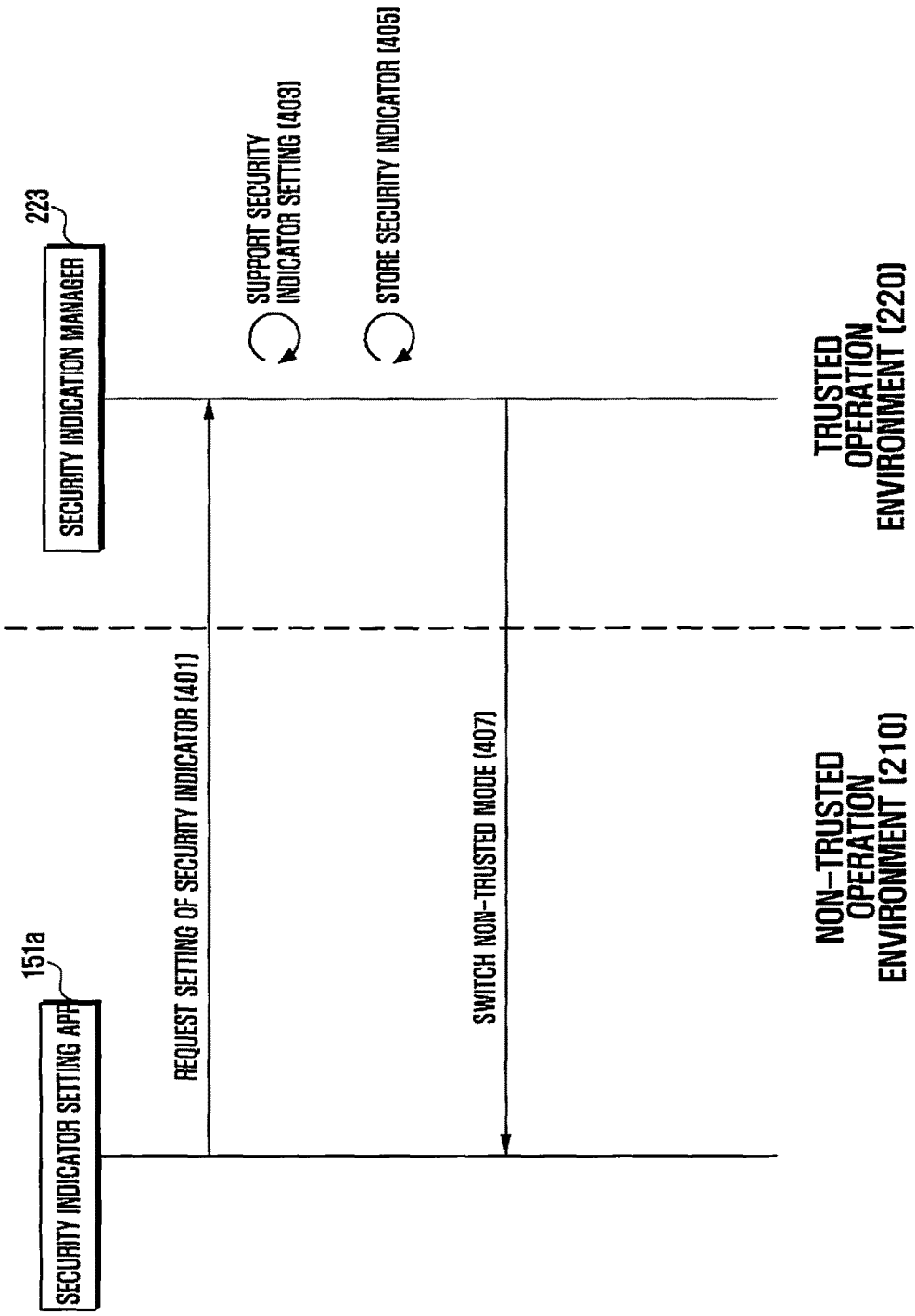
FIG. 4 is a signal flow diagram illustrating a method of setting a security indicator according to an embodiment of the present invention.

FIG. 4 is a signal flow diagram illustrating a method of setting a security indicator according to an embodiment of the present invention;

Referring to FIG. 4, the electronic device 100 provides an app for setting the security indicator in order to set the security indicator. The electronic device 100 may be in a state where the electronic device 100 completes the booting and is performing a function according to the preset schedule information or a specific function according to a user operation. For example, the electronic device 100 may be a runtime process according to the performance of the function. The runtime process is a process to be differentiated from the booting process. The electronic device 100 has a power turn-off state, a booting state, and a runtime state. The runtime state is a state in which the specific function is performed after the completion of the booting. The specific function may include an idle screen providing function, a music playing function, a video playing function, a broadcasting receiving function, a sleep function, and the like.

The electronic device 100 stores a security indicator setting app 151*a* in the storage unit 150. The electronic device 100 assigns an icon, a menu item, a hot key, or a specific button key for activating the security indicator setting app 151*a*. Further, when an input signal for the activation of the security indicator setting app 151*a* is generated, the electronic device 100 activates the security indicator setting app 151*a*. According to the activation of the security indicator setting app 151*a*, the security indicator setting app 151*a* requests a security indicator setting request from the security indication manager 223 in step 401.

The security indication manager 223 supports the security indicator setting in step 403 according to the request. In this case, the security indication manager 223 outputs a security indicator setting screen image for setting the security indicator to the display module 140. The security indicator setting screen image is formed of a similar screen image to the security indicator setting screen image provided in the booting process. Alternatively, the security indicator setting image is formed of screen images supporting so that the preset security indicator is changed or edited. For example, when the security indicator is formed of a text, the security indicator setting screen image includes at least one of virtual key buttons for changing a character of the text or virtual menu item buttons for changing a size, a color, and a shape of the text. When the security indicator is formed of the image, the security indicator setting screen image includes at least one of a menu item supporting so that another image is selected, and virtual edition tools for editing a currently displayed image. The security indicator setting screen image includes at least one of an item for receiving a text to be used as the security indicator from another device and a tool supporting the edition of the image to be used as the security indicator.

The user may newly select the security indicator, or edit and renew the previous security indicator by using the aforementioned security indicator setting screen image. Further, the user may request the storage of the renewed security indicator. To this end, the security indicator setting screen image includes an item for storing the security indicator. When the storage of the security indicator is requested, the security indication manager 223 stores the security indicator in a predetermined storage region in step 405.

The security indication manager 223 requests non-trusted mode switching from the security indicator setting app 151*a* in step 407. The security indicator setting app 151*a* outputs a security indicator setting completion message while performing the non-trusted mode switching. Further, the security indicator setting app 151*a* is automatically ended according to the completion of the setting. According to the automatic end of the security indicator setting app 151*a*, the previously performed function, for example, the idle screen, is output to the display module 140. Otherwise, the screen image to which the specific user function or the security function is applied is output to the display unit 140.

Figure 5:
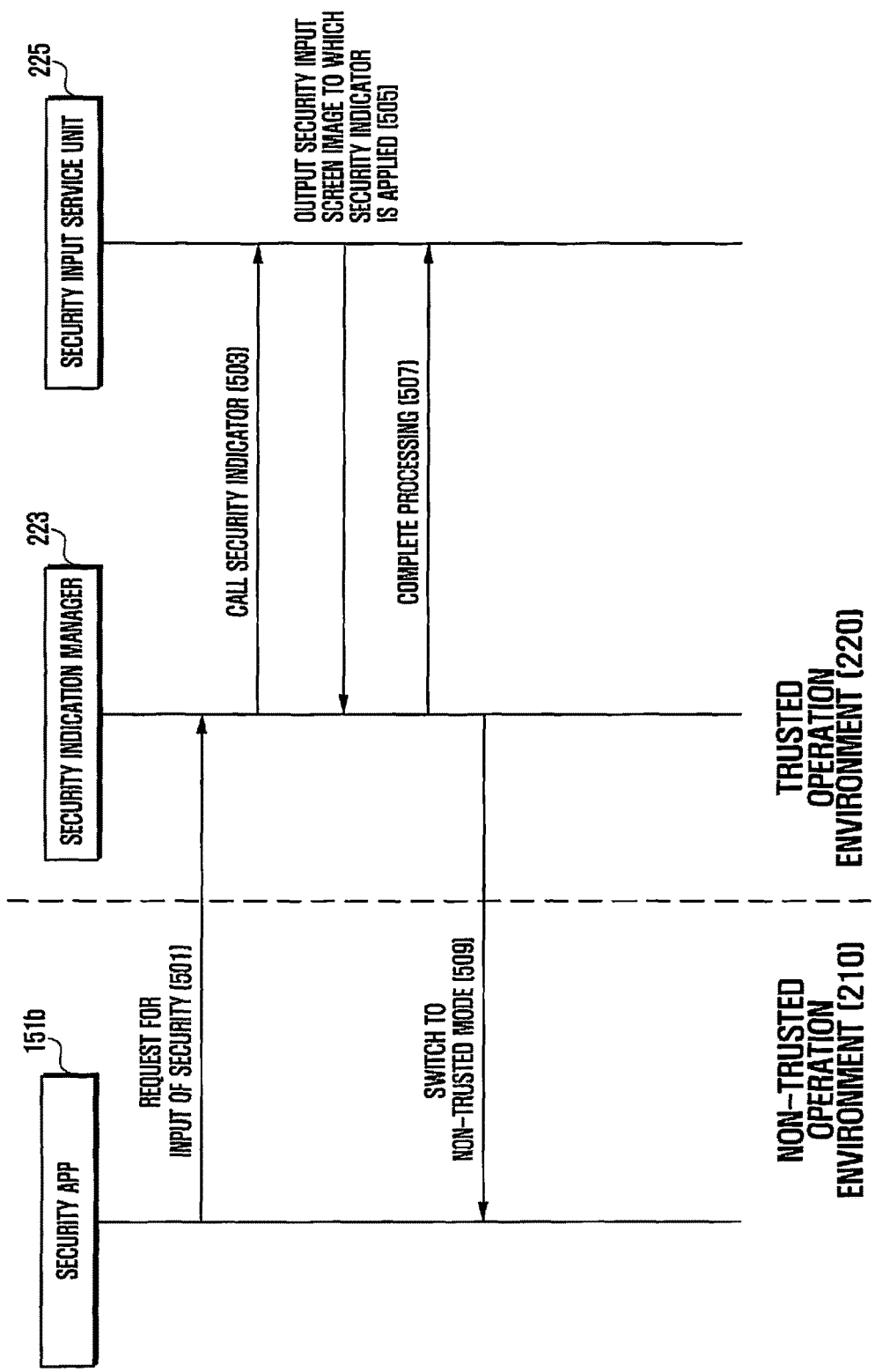
FIG. 5 is a signal flow diagram illustrating a method of applying a security indicator according to the an embodiment of the present invention.

FIG. 5 is a signal flow diagram illustrating a method of applying a security indicator according to the an embodiment of the present invention;

Referring to FIG. 5, the electronic device 100 for outputting the security indicator provides a specific icon, a menu item, or the like to support so that at least one of the plurality of the apps 151 stored in the storage unit 150 may be selected. Further, when an input event for activating a security app 151*b* in at least one of the plurality of the apps 151 is generated, the electronic device 100 reads and processes routines related to the corresponding security app 151*b*. Accordingly, the electronic device 100 outputs a screen image according to the operation of the security app 151*b* to the display module 140. When an event requesting security input is generated during a process of performing the function according to the user manipulation or a specific schedule, the security app 151*b* transmits a security input request to the security input service unit 225 in step 501. The security input service unit 225 is a process for supporting the processing of the security input among processors disposed in the trusted operation environment 220. The security input service unit 225 is called by the security operation unit 221, or directly performs a task according to the call by the security app 151*b*.

When the security input service unit 225 receives the security input request from the security app 151*b*, the security input service unit 225 requests a call of the security indicator from the security indication manager 223 in step 503. Further, the security input service unit 225 transmits the security input screen image to the security indication manager 223 together with the request in step 505. The security input screen image is an input screen image supporting the security function. For example, the security input screen image has a security function capable of encrypting the touch event generated by the user, or encrypting a number of a character or a position designated by the touch event.

When the security indication manager 223 receives the request for the call of the security indicator from the security input service unit 225, the security indication manager 223 checks whether there is present a set security indicator. When there is the set security indicator, the security indication manager 223 supports so that the security indicator is applied to the security input screen image provided by the security input service unit 225 and outputs to the display module 140. Here, when there is no set security indicator, the security indication manager 223 applies a security indicator set as a default to the security input screen image. Alternatively, when there is no set security indicator, the security indication manager 223 outputs the security input screen image together with a message notifying that there is no separate security indicator setting. The security indication manager 223 outputs at least one of haptic information, such as vibration, and sound information, such as a sound, as well as visual information, such as an image and a text, during the process of outputting the security indicator. Alternatively, the security indication manager 223 outputs at least one of the visual information, the haptic information, and the sound information according to the user setting. The visual information, the haptic information, and the sound information is output once at an initial time at which time the security input screen image is output or which may be repeatedly output at a predetermined period.

When the operation of the security function based on the security input screen image is completed, the security indication manager 223 transmits a processing completion message to the security input service unit 225 in step 507. To this end, an item capable of the completion of the processing may also be output on the security input screen image. Otherwise, the electronic device 100 generates an input event corresponding to the completion of the processing of the security input function based on a sensor signal generated according to a specific button key or a gesture operation.

When the security input service unit 225 receives the processing completion message, the security input service unit 225 transmits a message requesting non-trusted mode switching to the application app 151b in step 509. Additionally, the security input service unit 225 performs processing on input information collected by the security input screen image before the non-trusted mode switching. The processors, that is, the security input service unit 225, and the security indication manager 223, disposed in the trusted operation environment 220 according to the non-trusted mode switching may be in a standby state, a sleep state, or a state in which the memory allocation is released.

Figure 6:
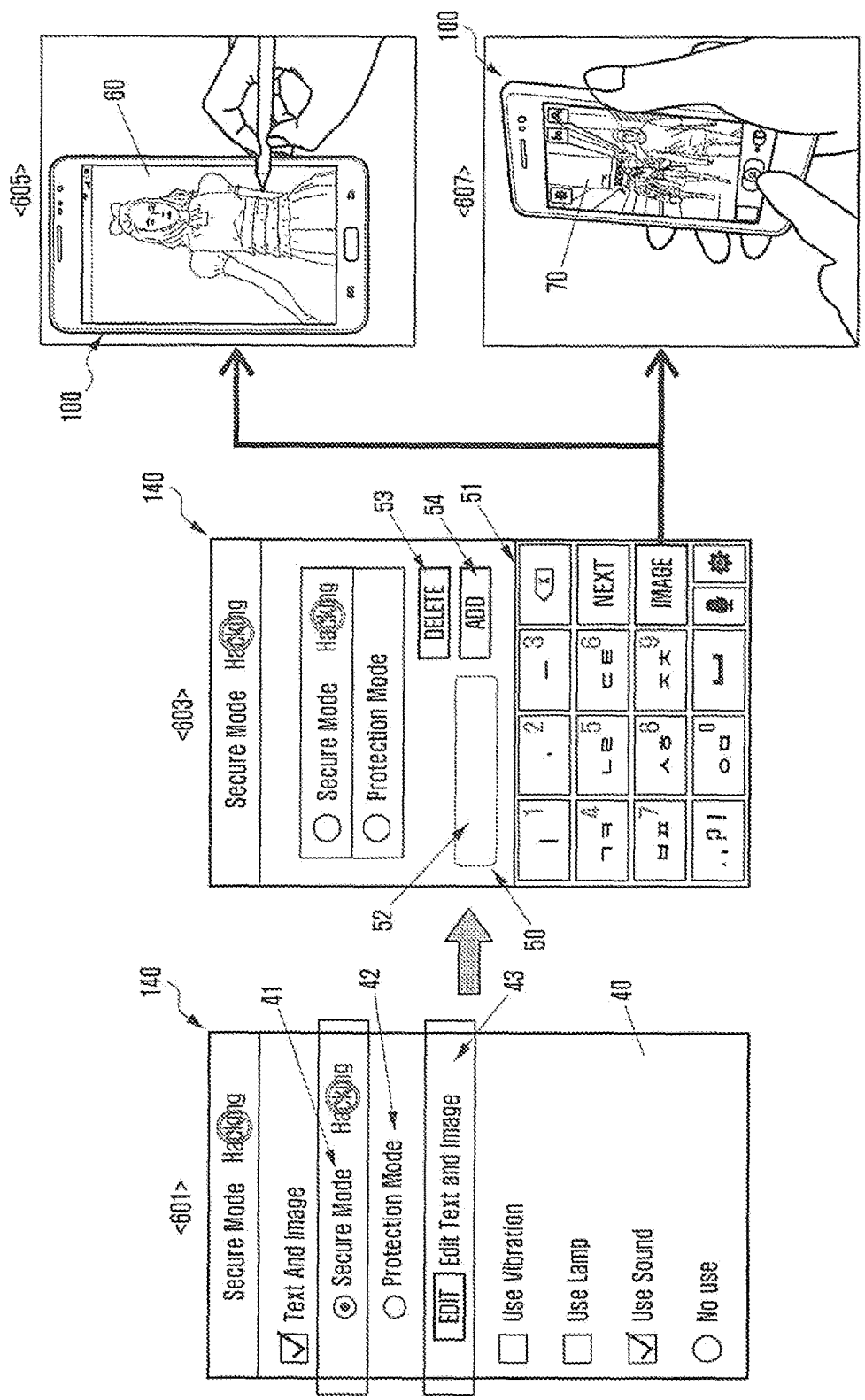
FIG. 6 is an illustration of a screen of an electronic device used for setting a security indicator according to an embodiment of the present invention.

FIG. 6 is an illustration of a screen of an electronic device used for setting a security indicator according to an embodiment of the present invention; and Referring to FIG. 6, when a request for setting of the security indicator is generated or a request for activation of the security indicator setting app 151a is present during the process of performing the booting, the display module 140 of the electronic device 100 outputs a security indicator setting screen image 40 as illustrated in screen 601. The security indicator setting screen image 40 includes a menu item corresponding to each item so that at least one of a text and image mode, a vibration mode, a lamp mode, a sound mode is selected. Further, the security indicator setting screen image 40 includes a setting item for preventing the security indicator from being applied. Screen 601 indicates the selection of a text and image item. When the text and image item is selected, the security indicator setting screen image 40 provides items through which modes, for example, a secure mode item 41 and a protection mode item 42, to which the text and image is to be applied, are selectable. The secure mode item 41 is an item setting so that the security indicator is output during the use of the security function. The protection mode item 42 is an item setting so that a text or an image is output for protection of the screen and the like. When the secure mode item 41 is selected, the security indicator setting screen image 40 provides an editing item 43 through which the text and the image may be edited.

When the editing item 43 is selected, the display module 140 outputs a security indicator editing screen image 50 as illustrated in screen 603. The security indicator editing screen 50 includes a virtual key region 51 for inputting a text, an output region 52 through which texts corresponding to virtual keys selected in the virtual key region 51 are output, a deletion item 53 for deleting a text registered as a previous security indicator, an addition item 54 for adding the input text, and the like. The virtual key region 51 includes a virtual button region through which a plurality of characters, numbers, or special characters is selectable. Further, the virtual key region 51 includes a virtual image button region so that the image is selectable as the security indicator.

When the virtual image button region is selected in screen 603, the electronic device 100 supports the editing of the image to be used as the security indicator as illustrated in screen 605. To this end, the electronic device 100 provides image items through which the image to be used as the security indicator is selectable. The image items are items of at least one of image stored in a gallery or images separately stored in the storage unit 150. The image item may also be an item through which an image applied as the current security indicator is editable. The display module 140 outputs the image according to the selection of the image item. The user may perform the editing of the image by using a finger, a touch pen, or the like. Alternatively, the electronic device 100 provide a drawing input screen 60 so that the user may directly draw an image. Then, the user may directly manufacture an image to be used as the security indicator based on the drawing input screen 60.

When the virtual image button region is selected, the electronic device 100 supports photographing of the image to be used as the security indicator as illustrated in screen 607. To this end, the electronic device 100 includes the camera module 170, and when a security indicator collection request is generated, the electronic device 100 activates the camera module 170. Further, when the image is collected, the electronic device 100 automatically outputs an image editing screen image 70 in which the collected image is editable. When there is no editing of the image or an event corresponding to the completion of the editing of the image is generated, the electronic device 100 sets the collected image as the security indicator. The electronic device 100 inserts an image editing item and a video collection item to the virtual key regions 51 in order to support the function for editing the image, and the function of collecting and editing the image based on the camera module 170, respectively. Then, the user may select and edit or photograph and edit the image to be used as the security indicator by selecting a desired item in the virtual key region 51 through the image editing screen image 70.

The image to be applied to the security indicator is resized according to a size of the security indicator region. Only a partial region in the selected image or the collected image is applied to the security indicator region. The size of the security indicator may be changed according to an adjustment by the user. Further, an output position of the security indicator may be changed according to adjustment by the user. For example, the security indicator may be output at an upper end or a lower end, or edges of both sides of the screen. Otherwise, the security indicator may be applied as a background screen image of a specific security function screen image as described below.

The security indicator may overlap one side of the security function screen according to the setting. Alternatively, the security indicator is output to a region obtained by the resizing of the security function screen according to the setting. A resizing size of the security function screen image is changed according to adjustment of the size of the security indicator. A resizing size of the security indictor may also be changed according to a default size of the security function screen image. When the size of the security indicator region is changed, a size of the image applied to the security indicator region, a compression type of the image, a length of the text, a size of the character, a line change, and the like applied to the security indicator region is changed.

FIG. 7 is an illustration of a screen of an electronic device used for applying a security indicator according to an embodiment of the present invention.

Referring to FIG. 7, the electronic device 100 is requested to support the security function during a process of performing the operation of the function of the specific app 151. For example, the electronic device 100 is requested to input a password, an account number, or a specific security number. Then, the electronic device 100 outputs a security number input screen image 700 for inputting a number, as shown in screen 701. The security number input screen image 700 includes an input region 710 and a security indicator 720. When the electronic device 100 is requested to output the security number input screen image 700 based on the security function, the electronic device 100 checks whether a set security indicator is present. Further, the electronic device 100 supports so that the set security indicator 720 is output as illustrated. Here, when there is no set security indicator, the electronic device 100 outputs a security indicator defined as a default, or notifies that there is no set security indicator. In this case, a notification message is provided as a sound or a vibration. Further, when a sound is also set when the security indicator is set, the electronic device 100 outputs a predefined guide sound or effect sound one time or may output a predefined guide sound or effect sound at a predetermined period together with the output of the security indicator 720 during a processing of outputting the screen 701. Otherwise, the electronic device 100 outputs a lamp flickering or a vibration one time or may repeatedly output a lamp flickering or a vibration at a predetermined period when outputting the screen image according to the request for the security function independent from the output of the security indicator 720.

The security indicator 720 may also be output as a background screen image 720a, as well as in a form disposed at an upper end of the screen as illustrated in screen 703. In screen 703, the security number input screen image 700 is formed of button regions and an output region each of which is output in an independent form on the background screen image 720a. The user may intuitively understand that the security function is currently executed through the display of the image on the background screen image 720a, and thus have reliability for the operation of the security function. The security indicator 720 disposed at the upper end is removed while the security indicator is provided as the background screen image 720a in screen 703.

As described above, the electronic device 100 in an embodiment of the present invention outputs the security indicator during the operation of the security function, thereby displaying a security function operation state through the security indicator.

In addition, the electronic device 100 may further includes various additional modules according to a provided form thereof. That is, in a case where the electronic device 100 is an electronic communication terminal, the electronic device 100 may also further include non-mentioned elements, such as a near field communication module for near field communication, an interface for transmitting and receiving data by a wired communication method or a wireless communication method of the electronic device 100, an Internet communication module for performing the Internet function by communicating with an Internet network, and a digital broadcasting module performing digital broadcasting receiving and reproducing functions. Although all such elements may not be enumerated since modifications thereof may be diversely made according to a convergence trend of digital devices, elements equivalent to the aforementioned elements may be further included in the devices. Further, in the electronic device 100 of an embodiment of the present invention, specific components may be excluded or replaced with other components in the configuration according to a provided form thereof. This will be easily understood by those skilled in the art to which the present invention pertains.

Further, the electronic device 100 according to an embodiment of the present invention may include, for example, any of the information communication devices, such as a Portable multimedia Player (PMP), a digital broadcasting player, a Personal Digital Assistant (PDA), a music player (for example, an MP3 player), a portable game terminal, a smart phone, a notebook computer, and a handheld PC, multimedia, and application devices for the multimedia, including any of the mobile communication terminals operated based on communication protocols corresponding to various communication systems.

Although embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirit of the present invention besides the embodiments disclosed herein can be carried out.

What is claimed is:

1. A method of operating a security function of an electronic device that is configured for wireless communication, the method comprising:
receiving a user request for activation of a security function during booting of the electronic device in a non-trusted operation environment;
confirming whether a security indicator, which is editable during the booting of the electronic device for changing at least one parameter that defines the security indicator, is set; and
when the security indicator is set,
initializing an operating system configured for use with a trusted operation environment,
applying the security indicator to a security function screen image, in response to the user request for the activation of the security function, and
outputting the security function screen image to a display of the electronic device.

2. The method of claim 1, wherein applying the security indicator to the security function screen image comprises applying the security indicator to a security number input screen image as a background screen image.

3. The method of claim 1, further comprising at least one of:
applying a default security indicator, when the security indicator is not set; and
outputting a message notifying that there is no set security indicator, when the security indicator is not set.

4. The method of claim 1, wherein applying the security indicator to the security function screen image further comprises at least one of:
disposing the security indicator on the display so as to be overlaid with the security function screen image;
determining a region on the display of the electronic device in which the security indicator is to be disposed, by resizing the security function screen image; and
disposing the security indicator in the determined region on the display of the electronic device, and disposing the security indicator on the display of the electronic device as a background screen image of the security function screen image.

5. The method of claim 1, further comprising at least one of:
outputting audio data corresponding to the security indicator;
performing lamp flickering corresponding to the security indicator; and
outputting vibration corresponding to the security indicator.

6. The method of claim 5, further comprising at least one of outputting one time, at least one of the audio data, the lamp flickering, the vibration, when the security indicator is output, and repeatedly outputting at a predetermined period, at least one of the audio data, the lamp flickering, the vibration, during the output of the security indicator.

7. The method of claim 1, further comprising:
receiving a user request for the setting of the security indicator during performance of a function;
outputting a screen image for setting the security indicator; and
setting at least one of a text, an image, audio data, lamp flickering, and vibration to be applied to the security indicator according to the received user request.

8. The method of claim 1, further comprising:
activating a camera for photographing an image, when an image item to be used as the security indicator is selected;
capturing an image by the camera; and
applying the captured image to the security indicator.

9. The method of claim 1, further comprising:
outputting a drawing input screen, when an image item to be used as the security indicator is selected;
capturing a image drawn on the drawing input screen; and
applying the drawn image as the security indicator.

10. An electronic device that is configured for communicating wirelessly and supporting a security function operation comprising:
a controller including a processor configured to receive a user request for activation of a security function during booting of the electronic device in a non-trusted operation environment, to confirm whether a security indicator, which is editable during the booting of the electronic device for changing at least one parameter that defines the security indicator, is set, and when the security indicator is set, to initialize an operating system configured for use with a trusted operation environment, to apply the security indicator to a security function screen image, in response to the user request for the activation of the security function, and
a display, which is controlled by the processor, configured to output the security function screen image.

11. The electronic device of claim 10, wherein the display outputs the security indicator on a security number input screen image as a background screen image.

12. The electronic device of claim 10, wherein when the security indicator is not set, the controller performs at least one of:
applying a security indicator defined as a default; and
controlling the display to output a message notifying that there is no set security indicator.

13. The electronic device of claim 10, wherein when applying the security indicator to the security function screen image, the controller disposes the security indicator on the display so as to be overlaid with the security function screen image, determines a region on the display in which the security indicator is to be disposed, by resizing the security function screen image, and disposes the security indicator in the determined region on the display, or disposes the security indicator on the display as a background screen image of the security function screen image.

14. The electronic device of claim 10, further comprising at least one of:
an audio processor configured to output audio data corresponding to the security indicator;
a lamp configured to perform lamp flickering corresponding to the security indicator; and
a vibration device configured to output vibration corresponding to the security indicator.

15. The electronic device of claim 14, wherein the controller controls so that at least one of the audio data, the lamp flickering, and the vibration is output one time, when the security indicator is output, or controls so that at least one of the audio data, the lamp flickering, and the vibration is repeatedly output at a predetermined period, during the output of the security indicator.

16. The electronic device of claim 10, wherein the controller controls to receive a user request for setting of the security indicator during booting or performance of a function and to set of at least one of a text, an image, audio data, lamp flickering, and vibration to be applied to the security indicator according to the received user request, and the display outputs a screen image for setting the security indicator.

17. The electronic device of claim 16, further comprising a camera configured to, when an image item to be used as the security indicator is selected, capture an image, and to apply the captured image as the security indicator.

18. The electronic device of claim 16, wherein the display outputs a drawing input screen for drawing an image to be used as the security indicator and the controller captures the image drawn on the drawing input screen and applies the drawn image as the security indicator.

* * * * *